United States Patent [19]

Olsson et al.

[11] Patent Number: 4,511,530

[45] Date of Patent: Apr. 16, 1985

[54] PROCESS FOR BLOWING FILM FROM LINEAR THERMOPLASTIC MATERIAL

[75] Inventors: Stefan Olsson, Gothenburg; Ralph Widenbäck, Stenungsund, both of Sweden

[73] Assignee: Unifos Kemi AB, Stenungsund, Sweden

[21] Appl. No.: 541,584

[22] Filed: Oct. 13, 1983

[30] Foreign Application Priority Data

Oct. 18, 1982 [SE] Sweden .............................. 8205912

[51] Int. Cl.³ .............................................. B29D 7/24
[52] U.S. Cl. ....................................... 264/564; 264/565; 425/72 R; 425/326.1
[58] Field of Search ............. 264/564, 565; 425/72 R, 425/326.1

[56] References Cited

U.S. PATENT DOCUMENTS

| | | | |
|---|---|---|---|
| 3,091,807 | 6/1963 | Turner et al. | 264/569 |
| 3,141,912 | 7/1964 | Goldman et al. | 264/564 |
| 3,243,486 | 3/1966 | Pilaro | 264/569 |
| 3,265,789 | 8/1966 | Hofer | 264/569 |
| 3,302,241 | 2/1967 | Lemmer et al. | 425/72 |
| 4,000,234 | 12/1976 | Pilgrim et al. | 264/564 |
| 4,204,819 | 5/1980 | Ushioda et al. | 265/565 |
| 4,399,094 | 8/1983 | Fujitani et al. | 425/72 R |

FOREIGN PATENT DOCUMENTS

| | | | |
|---|---|---|---|
| 2631631 | 2/1977 | Fed. Rep. of Germany | 264/565 |
| 0003787 | 2/1975 | Japan | 425/326.1 |
| 0023075 | 8/1975 | Japan | 425/72 |
| 0005340 | 2/1978 | Japan | 264/564 |

Primary Examiner—Jeffery Thurlow
Assistant Examiner—Patrick Dailey
Attorney, Agent, or Firm—Fred Philpitt

[57] ABSTRACT

A process at continuous blowing of film such linear thermoplastic materials which after that the plastic melt has left an annular die, when introducing gas to the inner of the tube, forms a neck part having an essentially constant diameter and then forms a rapidly expanding main bubble whereby the speed of the film at the upper part of the neck is kept above 15 m/min.

16 Claims, 2 Drawing Figures

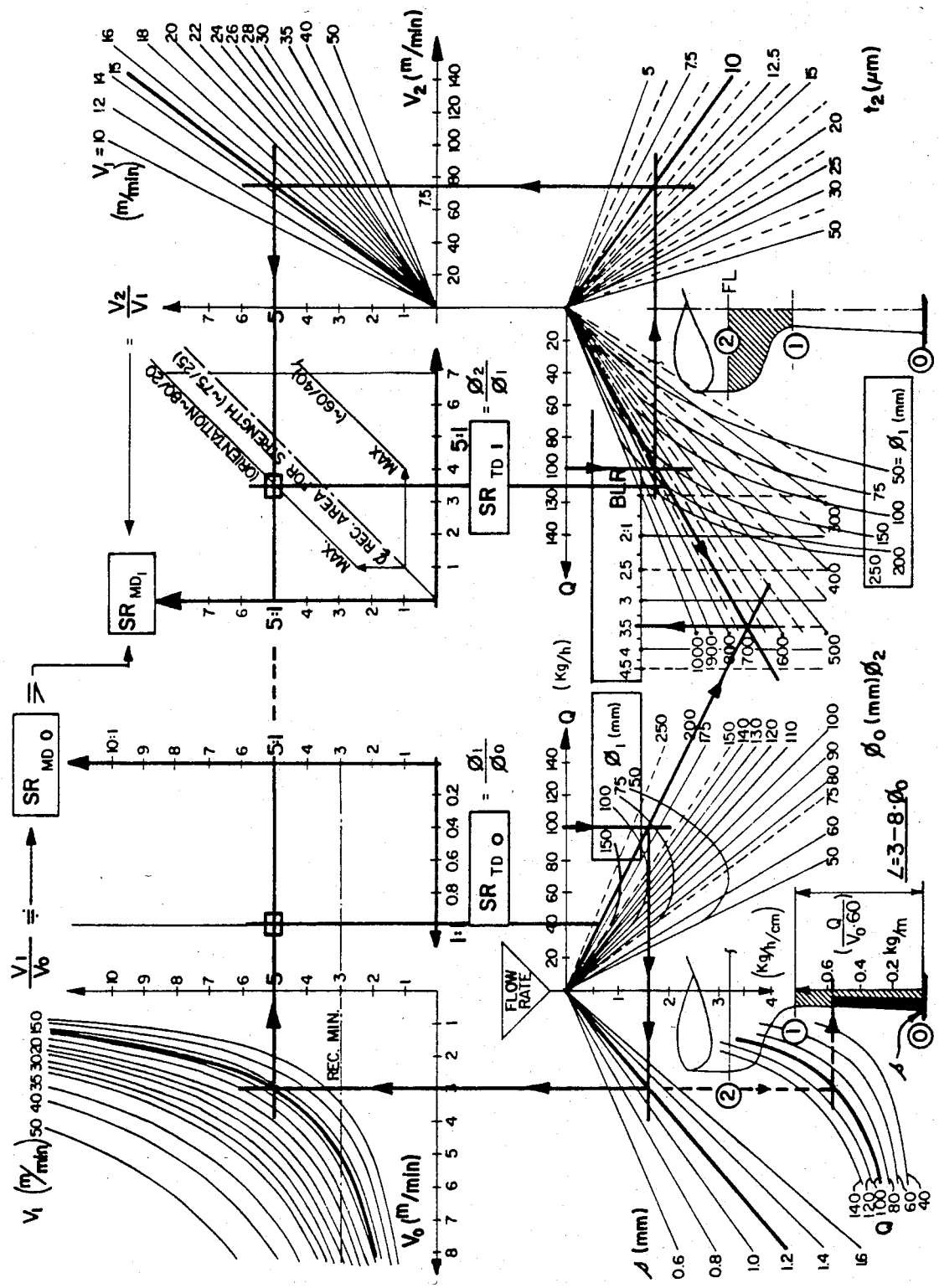

PROCESS FOR BLOWING FILM FROM LINEAR THERMOPLASTIC MATERIAL

TECHNICAL FIELD

The present invention relates to a process for blowing film from the kind of thermoplastic material which at the blowing first forms a neck with essentially constant diameter and thereafter forms a tubular bubble with rapidly increasing diameter before the freezing of the shape.

BACKGROUND OF THE INVENTION

When blowing film from thermoplastic material the molten material is extruded through an annular die and the formed tube of material is drawn away from the die and stretched in the direction of the movement. At the same time gas is introduced in the middle of the tube in such an amount that the tube is blown up and expands in the direction perpendicular to the movement. Substantially all the stretching in the two directions takes place before the material has become solidified and after the frost point the tubular body can be flattened and hauled off with the gas remaining in the expanding part of the tube.

The main object of the mentioned stretching in the machine direction (MD) and the transverse direction (TD), respectively, is to decrease the thickness of the film considerably relative to the thickness of the extruded tube of material. However, the stretching also leads to a molecular orientation and this orientation will be permanented in the form of built-in tensions when the material solidifies. These tensions show up for example at heating when the built-in forces are relaxed, and result in a shrinking of the film. Although the molecular orientation can be advantageous in some applications it is, for most purposes, desired that the material has as few built-in tensions as possible. Since it is not possible to avoid tensions entirely, it is desirable to keep them so evenly distributed that the material at the relaxation will shrink essentially uniformly in all directions, which is achieved with materials which at the production are uniformly stretched in both the mentioned directions. However, at blowing it is easier to achieve a high degree of stretching in the machine direction without problems than in the transverse direction. This is a result of the irregularities which are always present in the extruded thermoplastic material, e.g. due to impurities, temperature differences, shear stress from the die or non-uniform cooling. Each irregularity is enlarged with the degree of stretching but the drawing in the machine direction has a certain equalizing effect on the irregularities in this direction but there is no corresponding stabilizing effect in the transverse direction. Problems with the symmetry and stability of the tubular bubble thus limit the ratio of stretching in the transverse direction, and thus also the possible production in a given film blowing equipment.

Although the described problems arise for all thermoplastic materials they are far more troublesome at film blowing from linear thermoplastic materials, such as HD (high density) or LLD (linear low density) polyethylene, than for non-linear materials such as conventional LD (low density) polyethylene. The rheology of a conventional, highly branched LD-polyethylene is such that the tensions in and the viscosity of the material increases with increasing deformation. In general the elongation is concentrated to locally weakened areas in the film so that possible deviations tend to increase unlimitedly until breakage, but for the LD materials this is to a high degree counteracted since the viscosity at the same time increases in areas with a high stretch rate. Since the LD-materials also in other respects have a good cohesion and strength in a molten condition it has for these materials been possible to control the blowing process, also for very large tubular bodies.

The linear thermoplastic materials behave in a quite different manner. The viscosity does not increase, or increases just a little, at stretching with increasing deformation and there are no increases in tension to counteract an ever increasing elongation in the thinner and thinner areas of the film. The tendency of the materials to an explosion-like stretching will, among other things, manifest itself in the shape of the bubble at the production. When the melt has left the die it forms a thin neck, to a certain height, before the material has become sufficiently thin for the gas pressure to overcome the resistance to stretching when the expansion will occur rapidly to the final dimension. The material behaves in the same way where there are local weaknesses in the film, i.e. it stretches with increasing speed. This behaviour, in combination with the generally low melt strength of the materials, result in a difficultly controlled blowing process which does not infrequently give an asymmetrical and unstable bubble and result in final product which is not uniformly stretched. In more serious cases, pinholes are formed in the film and the tube collapses completely. The problems increase with increasing dimensions of the equipment and when attempts are made to increase the production in existing equipment, since the weight of the molten material that has to be stabilized increases and since the film thickness will be relatively smaller so that the problems with instability grow.

Various attempts have been made to solve these problems, e.g. by supporting the film in different manners before the solidification, by modifying the plastic material and making it less linear or by different ways of differentiated and controlled cooling of the tube. Such methods have made it possible to increase the stability in the procuction process but it has not been possible to increase the dimensions of the equipment or the production capacity to any appreciable extent.

The insufficient understanding of the influence of changes in the stretching on the properties of the final material is a further problem. While it is fairly easy to predict the influence of changes in the stretch ratio on the final product when LD-materials are blown, it has been found considerably more difficult to predict the shrink properties of the final products when changes are made in stretching processes for linear materials. This lack of understanding of the basic principles in the stretch process has made it more difficult to solve the above described problems. While it today is fairly easy to blow LD-polyethylene with a high capacity to a diameter of more than 4 meters, equipment for linear polyethylene has far from that capacity. These capacity problems have seriously limited the distribution of linear plastic materials as film material, despite excellent properties otherwise, e.g. a generally lower degree of orientation than for the LD-materials.

The Invention Generally

It is an object of the present invention to avoid the above mentioned problems at blowing linear thermoplastic materials and it is a special object to make it possible to use equipment of greater dimensions or to increase the production capacity in existing equipment. A further object is to make it possible to increase the actual stretch ratio in the transverse direction of the film. Further objects are to improve stability and smoothness of the film bubble.

These objects are achieved by the characteristic features of the process as evident from the claims.

The invention relates to blowing of such materials which form a neck with an essentially constant cross section and most often a cross section which gets more narrow towards the upper end before the bubble expands to its full size.

According to the invention care should be taken in these processes to ensure that a substantial part of the total stretching in the machine direction takes place between the exit of the melt from the die gap and the upmost part of the neck, which is frequently also the most narrow part of the neck. This means that the stretch ratio between the die gap and the upmost part of the neck should be great compared with the stretch ratio between the upmost part of the neck and the frost line. It is hereby important that the speed of the film melt is high at the upmost part of the neck.

The suggestion of the present invention is founded on the observation that there is a considerable difference in the stretch pattern from the die gap to the upmost part of the neck and between the upmost part of the neck and the frost line, respectively. The material transport from the die up to the main bubble is fairly slow and takes several seconds. At the same time, the temperature is high and the stretching or compression in the transverse direction is comparatively small and this means that the simultaneous relaxation in the melt substantially entirely counteracts orientation in the transverse direction. This, in combination with the simultaneous stretching in the machine direction, results in that the material can be considered as non-stretched in the transverse direction at the place where the neck is most narrow. Also for the stretching in the machine direction up to the upper part of the neck, a stretching which is considerably greater than in the transverse direction, goes that as far as orientation is concerned it is essentially completely counteracted by the relaxation. The material can thus be considered as unoriented at the upper part of the neck and the stretch phase up to this point can consequently be described as a relaxation-stretching. The following stretching, however, between the upper part of the neck and the frost line, will take place so rapidly, in fractions of a second, and involves such substantial stretch degrees in both directions that the relaxation here is insignificant. During this phase the material will thus become oriented and this stretching-phase can thus be termed an orientation-stretching.

The process and the resulting orientation have previously in respect of stretching degree beed judged by the initial and final conditions. This view does not make it meaningful to try to achieve a higher degree of stretching during the first stretching phase but rather to attempt to reduce this to avoid destabilization. However, great advantages can be gained by achieving a considerable draw down in the machine direction already during the first stretching-phase.

Since the stretching during this phase does not result in any essential orientation, the starting conditions for a balanced stretching during the second phase will be better the more stretching that takes place in the machine direction during the first phase. During the second phase, the stretching in the machine direction can then be kept lower, relatively speaking, and this increases, again relative speaking, the importance of the stretching in the transverse direction during this stage. Since, as said above, the stretching in the transverse direction generally is the limiting factor this relative shift of the orientation makes it possible to obtain either better balanced material or an increased capacity. Furthermore, a substantial stretching during the first stage has an equalizing effect on irregularities in the tube and thus increases the stability in the blowing process.

An important factor in this respect is that at high degrees of stretching during the first stage, the diameter of the tube at the upper part of the neck will, for a given material, be less than at lower stretching degrees and in most cases a considerable compression of the neck diameter can be obtained, often greater than at hereto known stretch processes and machine sizes. Relatively speaking, smaller neck diameters have been found to be of value for the present purposes of at least two different reasons. The first is that a better equalizing effect on the irregularities in the distribution of the material around the circumference is obtained at small neck diameters. The irregularities increase at the expansion of the neck and decrease at compression of the neck diameter at the peripheral flowing of the material which is a consequence of the considerable stretching in the machine direction that takes place. The equalizing effect further has the advantage of taking place in the best possible position for stabilization purposes, namely immediately before the explosive expansion in the cross direction. Known measures for equalizing are generally applied at lower levels of the neck and are thus not effecient against random or induced variations which occur later. The other important advantage reason of having a small neck diameter is that a narrow neck gives a considerably greater actual stretch ratio in the transverse direction. With a relatively speaking narrower neck it is possible to obtain a starting position for the cross expansion phase with a material tube of a small diameter and with a low degree of transverse orientation, which gives a great actual transverse stretch ratio during the second stretch phase and this, again, makes it possible either to have a better balanced material or a higher production capacity.

By increasing the diameter of the die the capacity can be increased in a suitable manner according to the invention, since it is, among other things, comparatively easier to obtain a stable and uniform tube and to achieve a substantial relaxation-stretching phase when starting form a large initial diameter.

It has been found important to establish the conditions at the upper part of the neck and particularly to measure the diameter and the speed at this point, not only for the above stated purposes but also to get an improved general understanding of the process at stretching linear materials, to be able to more precisely predict the result of changes and control measures in the process and to be able to compare and quality classify the materials obtained in the process.

Further objects and advantages of the invention will be evident from the detailed description below.

DETAILED DESCRIPTION OF THE INVENTION

The present invention can be applied in all film blowing situations wherein a neck of substantially constant cross section is formed before the actual expansion. If the neck does not have a pronounced most narrow part, the point where the bending outwards of the film is strongest, i.e. where the radius of the bending is smallest, shall be considered the uppermost part of the neck. It is, however, preferred that the invention is applied in processes and for materials where it is possible to cause a compression in the direction transverse to the machine direction before the real expansion in the transverse direction occurs, i.e. in all situations at film blowing wherein an upwards narrowing tube can be obtained before the tube expands. For most thermoplastic materials a shrinkage of this kind can be obtained by using mechanical means, e.g. by using a mandrel or a guiding surface for the melt or by compressing the tube by means of directed airstreams. In all these cases an improved starting situation for the later stretching in the transverse direction is obtained after the compression. To gain the full effects of the advantages of a strong stretching during the first phase it is, however, preferred that the invention is applied to materials which permit drawing in such a manner that a marked two-phase stretching according to the above, will occur spontaneously, without mechanical compression. This is normally the case for polymers having a linear configuration, i.e. polymers having an essentially straight carbon chain without larger branchings and without, or with just a limited fraction, short side-branches. For polyethylene, which is particularly suitable for use in the process according to the invention, this is valid for the HD-materials produced at low pressures and for such materials of low density which have also been produced at low pressures, so-called LLD-polyethylene. The later materials are obtained by copolymerization of ethylene and smaller amounts, e.g. between 3 and 15 percent, olefins having a longer carbon chain than ethylene, e.g. having a chain of 3 to 10 carbon atoms. Although these materials are linear, the comonomer gives rise to short side-branches which lowers the density of the polymer. As has been discussed above, the rheology of the linear materials allow them to exhibit a very rapid stretching and expansion at blowing.

As said, according to the invention a high speed of the melt shall be maintained at the upper part of the neck before the actual blow up in order to obtain the above advantages. The speed at this point is a critical factor for several other reasons. It summarizes several additional process parameters such as cooling speed and initial conditions besides the material properties. A high speed at this point means that a substantial part of the stretching in the machine direction shall take place between the die gap (level 0) and the upper part of the neck (level 1) compared with the stretching between the upper part of the neck (level 1) and the frost line (level 2). If the stretch ratio in the first phase is expressed as the ratio ($V_1/V_o$) between the speed of the melt at the smallest neck diameter and the speed when the melt leaves the die and, if the stretch ratio in the second stage, in a corresponding manner, is expressed as the speed ratio $V_2/V_1$ between the levels 1 and 2, then the quotient between these ratios (i.e. $V_1/V_0:V_2/V_1$) should be at least 1:1, preferably at least 1.2:1 and preferably also at least 1.5:1. The absolute speed at this point is also of interest as it is related among other things to the capacity. The speed should not be below 15 meters/min. it is preferably above 20 meters/min. and most preferably above 30 m/min.

As has been mentioned the stability of the process and the capacity can be further improved if there is a shrinking of the neck before the final expansion. A shrinking is thus preferred. The shrinking is normally not very extensive since it is counteracted by the pressure of the gas which is supplied to the inner of the tube. For materials with a low melt strength the material in the tube will furthermore accelerate slowly in the tube until the rapid crosswise expansion takes place and in these cases the obtained shrinking degree is very low. Further, it is generally desirable to have a rapid cooling of the tube in the beginning and measures to achieve this counteract the shrinking of the tube. It is thus unusual that the smallest part spontaneously will be below 90 percent of the diameter of the die. If it is desired to have a shrinking in the process of the invention this shrinking degree should be exceeded. A shrinking should take place to below 80 percent of the die diameter, preferably to below 60 percent and most preferably below 50 percent of the die diameter. However, at really large dies, small die gaps and high film speed the shrinking will be smaller.

At a high degree of stretching in the first stage a fairly long neck tend to form an it is thus suitable to start from a tube having a large initial diameter since the stability of such a tube will be much better than for a tube of smaller initial dimension. It is also easier to achieve a high capacity or a better balanced final product with a larger tube. It is thus preferred that the die diameter exceeds 20 cm in processes according to the invention. Suitably it is also larger 25 cm and most preferably larger than 30 cm. Of all different manners of obtaining an increase of the mass flow at the increased capacity made possible by the invention, it is thus preferred to increase the diameter of the die. The die slit can also be allowed to increase, for example to more than 1.2 and also to more than 1.5 mm. Wider slits than 3 mm, and particularly 2.5 mm, are generally not necessary. An increase of the speed of the melt from the die is a less suitable manner of achieving the increased capacity according to the method of the invention, since it counteracts a high stretch ratio in the first phase. The initial speed ($V_0$) can thus be kept within normal ranges of between 1 and 10 m/min. The total capacity can advantageously be kept above 100, above 125 and preferably also above 150 kg/h. The blow-up ratio, in the conventional meaning, i.e. the ratio between the final and the initial diameter respectively, can for example be kept below 3.5:1 and is preferably kept below 2.5:1. By use of the invention the final speed can be above 75 m/min., and for maximum production also above 100 m/min.. The draw down ratio can, as normal, be between 10 and 200 and particularly between 30 and 150. By means of the invention it is possible to produce thinner film with maintained strength. The final thickness can for example be below 20 $\mu$m and also below 15 $\mu$m.

The initial temperature of the melt when it leaves the die and the rate of cooling until the frost temperature influences the shape of the neck. With a decreasing initial temperature and an increasing rate of cooling, but otherwise constant conditions, the neck tends to become shorter. According to the invention it is advantageous to have a comparatively long neck, the magnitude being about more than 3 and preferably also above 5 die diameters. Normal initial temperatures are between 180° and 250° C. and according to the invention it is advantageous to have a temperature in the lower part of this range and preferably to keep it between 190° and 230° C. The rate of cooling can also be used to increase the length of the neck, e.g. by using less or warmer cooling air. It is suitable to have as uniform a stretching as possible in the neck for the object of the invention, i.e. the elongation shall be in the entire neck, and for this purpose it is suitable to keep the viscosity in the upper part of the neck high by having a low temperature in this part.

The properties and composition of the thermoplastic material can to a certain extent be utilized for influencing the stretch pattern. A high melt strength of the material is desired as this facilitates the formation of a neck with good coherence and an even stretching in this, which, in turn, facilitates a high degree of stretching in the first phase and high $V_1$. A lower melt strength results in a less uniform stretching along the entire height of the neck and thus also, for example, a small $V_1$. The melt strength can be increased by mixing the linear qualities with LD-polyethylene or by incorporating heavily branched structures in the linear materials. However, some of the advantageous properties of the linear material will be lost by this. It is thus preferred that the melt strength is increased with maintained linearity of the material which thus to at least 90 percent and preferably to a 100 percent should be made up of linear components. A high melt strength can then be obtained e.g. by increasing the molecular weight distribution $M_w/M_n$, which should be within the range of 5 to 30 and preferably also between 10 and 25, by increasing the molecular weight $M_w$ which should be between 100 000 and 500 000 and preferably between 150 000 and 300 000 or to increase the viscosity in another manner using additives. For LLD it is particularly advantageous to increase the melt strength by increasing the amount and/or the length the branches which in a controlled manner are introduced in the linear chain in the low pressure materials, as mentioned above. If short side-branches are introduced in a substantially linear material the density and the melt strength will first decrease. If the amount of branches is increased somewhat the density will decrease only little further while the melt strength will increase. Comonomers having more than 5, and preferably more than 6 carbon atoms are thus preferably used. The comonomers should, however, have less than 15 carbon atoms. The number of side-branches can advantageously be between 10 and 70 per 1000 carbon atoms in the chain and preferably between 20 and 50. The density should be above 930 kg/m$^3$.

The orientation, and not the actual stretch ratio, is important with respect to the properties of the products. The orientation obtained in the material can be established objectively by a relaxation test in which the material is heated in an oven until the tensions are released whereby a shrinkage in proportion to the orientation is obtained. A uniform shrinkage in all directions is generally desired, i.e. about 50/50 orientation in the machine direction in relation to the orientation in the transverse direction. Since it is difficult to achieve a high degree of stretching in the transverse direction it is often necessary to compromise somewhat with an ideal balance of the material and allow a higher orientation in the machine direction, e.g. 60/40, 75/25 or even 80/20. In some cases it might even be desired to have a distorted balance. The invention can be applied to get a maximum capacity for all desired stretch ratios.

With respect to the many factors influencing the film blowing process it is unlikely that optimum conditions will be obtained by chance. For a given thermoplastic material in a given equipment it is according to the invention suitable to first set, in view of the desired final orientation, a somewhat too high stretch ratio in the machine direction compared with the stretch ratio in the transverse direction by hauling off the film from the equipment with a comparatively high speed and using a comparatively small gas pressure in the bubble. The initial temperature of the melt, the cooling rate or the cooling pattern is then changed until a film speed at the top of the neck according to the above given values, and preferably also to a minimum diameter of the neck, is obtained and the amount of gas or the pressure in the bubble is then increased until maximum transverse stretching without instability is obtained, whereafter the hauling off rate can be changed if the stretch result is not as desired. If the speed of the film or the diameter at the top of the neck is altered when adjusting the conditions in the machine and transverse directions the procedure can with advantage be repeated once or several times until a maximum $V_1$ at maximum production is obtained.

Since the final orientation is the most important parameter for assessing and optimizing the process and since determination of the final orientation by means of relaxation tests according to the above is time and labour consuming there is a need to be able to easily assess the final orientation from the parameters in the process and changes in these. It has been observed that if the stretch process is divided and considered as a two-stage process with the upper or most narrow part of the neck as the dividing point, the stretch conditions can be assessed with a high degree of control and predictability. Besides normally available process data only measurement of the diameter and the film speed at the upper part of the neck is required for this and these measures can be carried out using simple means. The diameter can e.g. be determined against a scale and the film speed can e.g. be measured by means of a rotating disc placed against the film, which the film can sustain at this point. In addition to assisting the optimization of the film blowing process the two-stage analysis can also be used to compare and classify the obtained film materials according to quality. The method will be illustrated more in detail below with reference to the accompanying drawing.

BRIEF DESCRIPTION OF THE DRAWINGS

FIGS. 1A and 1B show a nomographic chart suitable for use when analyzing the stretch pattern in a film blowing process.

DESCRIPTION OF DRAWING

The accompanying drawing is a nomographic chart suitable for use when analyzing the stretch pattern in a film blowing process and is based on a division of the process into two stages (compare the schematic figures of the bubble at lower part of the chart). One of the stages relates to the stretching from the die outlet (level 0) to the upper part of the neck or the narrowest part of this (level 1) while the other stage relates to the stretching from level 1 to the frost line (level 2). The left part of the nomographic chart is used to analyze the first stage and the right part of the chart is used to analyze the second stage. Shaded parts of the diagram shows the preferred areas in high production processes.

The use of the nomographic chart is illustrated by the example drawn thereon. In the left half of the chart the production rate is marked on the horizontal capacity scale Q, in this case 100 kg/h, and a vertical line is drawn downwards from this point until it crosses one of the straight lines for the used die diameter $\phi_o$, in this case 200 mm. From this point a horizontal line is drawn towards the left in the diagram until it crosses one of the straight lines for the size of the diameter slit, which in this case is 1.2 mm. If desired, the mass flow per cm of the circumference of the die expressed in kg/h/cm can be read where the horizontal line passes the axis marked "flow rate". The weight of the neck tube per meter can if required be read on the vertical axis under the "flow-rate"-axis if a vertical line is drawn from the previously discussed point of intersection with the s-line 1.2 to the point of intersection for the lower capacity curve Q for 100 kg/h and is then transported at right to the mentioned axis where the value of about 0.55 kg/m can be read. From the point of intersection on the s-line 1.2 mm a line shall be drawn vertically upwards, and hereby the film speed at level 0 can be read (about 3 m/min.) at the point of intersection with the axis marked $V_0$, whereafter the line is drawn further to the point of intersection with one of the lines for the film speed $V_1$ at level 1, which is measured in the process and in this case is 15 m/min. To obtain the stretch ratio in the machine direction during the first stage a horizontal line is drawn from this point of intersection to the right to give a point of intersection with the line marked $V_1/V_0$ or a point of intersection with the line marked $SR_{MD(o)}$ where the stretch ratio in this case can be read to be about 5. The stretch ratio in the transverse direction $\phi_1/\phi_0$ can be constructed if on the previously used line for the die diameter $\phi_0$ 200 mm is marked the point of intersection with the curve $Q_1$ for the in the process measured neck diameter $\phi_1$ at level 1, in this case about 200 mm, and a vertical line is drawn from this point upwards whereby the stretch ratio 1:1 can be read on the axis marked $SR_{TD(o)}$. A quadrant can now be completed in the SR-diagram by means of which the stretching in the machine- and transverse directions that has taken place between the levels 0 and 1 can be analyzed visually in respect of degree and mutual relationship. In this case there has thus not been any stretching in the transverse direction while the stretching in the machine direction has been 5 times. However, this stretching can be considered as relaxed.

In a corresponding manner the stretch pattern during the second stage can be analyzed using the right part of the nomographic chart. Starting from the previous value for the capacity, 100 kg/h, a point can be marked on the capacity axis Q and a vertical line be drawn downwards from this point until it intersects the line $\phi_2$ for the final diameter of the tube, which in this case is 700 mm. From this point the line is drawn horizontally to the right until it crosses the line $t_2$ for the final thickness of the film, in this case 10 μm. The final vertical speed of the film (75 m/min.) can now be read on the scale $V_2$ if a line is drawn vertically upwards from the just mentioned point of intersection and if the line is drawn further upwards to the point of intersection on the curve for the measured film speed $V_1$ at level 1, 15 m/min., it can then be transported horizontally to the left to give the stretching that has taken place between level 1 and 2, either on the scale $V_2/V_1$ or on the scale $SR_{MD(1)}$, where a value of about 5 can be read, i.e. the same as the stretching in the machine direction during the first stage. The stretching in the transverse direction for the second stretch phase can be constructed starting from the point of intersection between the superposed curves for the neck diameter $\phi_1$ and the final diameter $\phi_2$, the values being 200 and 700 mm respectively, if a vertical line is drawn upwards from this point to the point of intersection on the axis $SR_{TD(1)}$ where the stretch ratio of about 3.5 can be read. If the line is drawn further upwards to the point of intersection with the previously drawn line for the stretching in the machine direction a quadrant in the right hand part of the SR-diagram can be completed by means of which the stretch pattern between the levels 1 and 2 can be analyzed visually. In this case the stretching during the second phase is thus 60/40. The blow-up ratio, i.e. the ratio between the final diameter of the bubble, $\phi_2$ and the diameter of the die $\phi_o$, can be read on the scale BUR if a line is drawn vertically upwards from a point of intersection with the $\phi_2$-line (700 mm) and the extended $\phi_o$-line (200 mm) from the left part of the chart. The BUR-value is in this case 3.5.

When the stretch pattern in both stretch directions is assessed by means of the two construed quadrants it must be taken into consideration that the final orientation in the material does not directly follow from the stretching which has taken place in both stretch directions, neither in respect of degree nor in respect of direction. For example, as mentioned, a stretching between level 0 and level 1 does not result in any significant orientation due to the simultaneously ongoing relaxation, but the rapid process between the levels 1 and 2 means that the right hand quadrant more completely refelcts the obtained orientation. The materials can thus be considered as being oriented in a manner corresponding to the stretching according to the right quadrant, i.e. MD/TD 60/40.

EXAMPLE

A HD-polyethylene having a molecular weight around 200 000, $MI_{21}$ around 10, a molecular weight ($M_w/M_n$) distribution of about 15, a density of about 955 and having about 2 short side branches per 1000 carbon atoms and containing conventional antioxidants and lubricants was blown to a film in an equipment having a die diameter of 200 mm and a die gap of 1.2 mm.

The process was set in such a manner that a film speed ($V_1$) of the upper part of the neck of 20.5 m/min. was obtained when the diameter of the neck was somewhat less than 200 mm.

Hereby a production of 107 kg/h could be obtained when the rate for hauling-off the finished film ($V_2$) was 82 m/min., the final thickness of the film 12 μm, the blow-up ratio (BUR) 3:1 and the neck length (L) 1.3 m.

The material obtained was well balanced despite the high production capacity, and at tear tests it was found that it had been possible to have a higher degree of stretching in the machine direction without impaired quality.

We claim:

1. A method for the continuous blowing of film from linear polyethylene materials which, after exit of a melt of the thermoplastic material from an annular die accompanied by introduction of air to an interior of the tubular melt thus formed, forms a neck portion having an essentially constant diameter followed at its upper part by rapidly diverging main bubble before solidification at a frost line, the upper part of the neck being defined as the most narrow part or the part where the outward bending has its smallest radius, the improvement comprising, ejecting the melt from an annular die of a diameter greater than 200 mm and manipulating the melt temperature, the cooling rate and the take-up speed to (a) give a linear film velocity ($V_1$) at the upper part of the neck exceeding 15 m/min., and (b) give a linear velocity ratio ($V_1/V_o$), between the velocity of the material at the upper part of the neck portion ($V_1$) and the velocity of the material when leaving the annular die ($V_o$), at least as great as the velocity ratio ($V_2/V_1$), between the final velocity of the material at the frost line ($V_2$) and the velocity ($V_1$) at the upper part of the neck portion.

2. The method of claim 1 wherein the speed ($V_1$) is kept above 20 m/min.

3. The method of claim 1 wherein the diameter of the die ($\phi_o$) is greater than 250 mm.

4. The method of claim 1 wherein the stretch ratio in the machine direction up to the narrowest part, expressed as $V_1/V_o$, is at least as great as the stretch ratio in the machine direction between the narrowest part of the neck and the frost line, expressed as $V_2/V_1$.

5. The method of claim 1 wherein the length of the neck (L) from the die opening to its upper part exceeds 3 times the die diameter ($\phi_o$).

6. The method of claim 1 wherein the final speed of the film ($V_2$) is greater than 75 m/min.

7. The method of claim 1 wherein the production capacity exceeds 100 kg/h.

8. The method of claim 1 wherein the blow-up ratio (BUR) is less than 3.5.

9. The method of claim 1 wherein the slit of the annular die is greater than 1.2 mm.

10. A method for continuous blowing of film from linear polyethylene materials which, after exit of a melt of the thermoplastic material from an annular die accompanied by introduction of air to an interior of the tubular melt thus formed, forms a neck portion having an essentially constant diameter followed at its upper part by a rapidly diverging main bubble before solidification at a frost line, the upper part of the neck being defined as the most narrow part or the part where the outward bending has its smallest radius, the improvement comprising ejecting at least 100 kg melt per hour from an annular die of a diameter greater than 200 mm and having a slit width exceeding 1.2 mm and manipulating the melt temperature, the cooling rate and the take-up speed to (a) give a linear film velocity ($V_1$) at the upper part of the neck exceeding 15 m/min, and (b) give a linear velocity ratio ($V_1/V_o$), between the velocity of the material at the upper part of the neck portion ($V_1$) and the velocity of the material when leaving the annular die ($V_o$), at least as great as the velocity ratio ($V_2/V_1$), between the final velocity of the material at the frost line ($V_2$) and the velocity ($V_1$) at the upper part of the neck portion, and (c) give a neck length measured from the die opening to the upper part of the neck portion, exceeding 3 times the diameter, while maintaining a take-up velocity above 75 m/min. and restricting the blow-up ratio to less than 3.5.

11. The method of claim 10 wherein the speed ($V_1$) is kept above 20 m/min.

12. The method of claim 10 wherein the diameter of the die ($\phi_o$) is greater than 250 mm.

13. The method of claim 10 wherein the stretch ratio in the machine direction up to the narrowest part, expressed as $V_1/V_o$, is at least as great as the stretch ratio in the machine direction between the narrowest part of the neck and the frost line, expressed as $V_2/V_1$.

14. The method of claim 10 wherein the length of the neck (L) from the die opening to its upper part exceeds 3 times the die diameter ($\phi_o$).

15. The method of claim 10 wherein the production capacity exceeds 100 kg/h.

16. The method of claim 10 wherein the slit of the annular die is greater than 1.2 mm.

* * * * *